United States Patent [19]

Riddle

[11] 4,379,565
[45] Apr. 12, 1983

[54] NONFOULING WHEEL HOUSING FOR COMPACTION VEHICLE

[75] Inventor: Charles F. Riddle, Brookfield, Wis.

[73] Assignee: Rexworks Inc., Milwaukee, Wis.

[21] Appl. No.: 285,202

[22] Filed: Jul. 20, 1981

[51] Int. Cl.³ ............................................. B60R 19/00
[52] U.S. Cl. ..................................... 280/160; 74/609;
172/508
[58] Field of Search ..................... 280/160, 160.1, 161;
293/58, 112; 172/508, 509, 514, 517; 56/320.1;
74/609; 474/144; 305/11, 12

[56] References Cited

U.S. PATENT DOCUMENTS

| | | | |
|---|---|---|---|
| 774,706 | 11/1904 | Smith | 280/160 |
| 2,146,882 | 2/1939 | Baker et al. | 305/12 |
| 2,959,069 | 11/1960 | Volhard | 474/144 |

FOREIGN PATENT DOCUMENTS 896542  2/1945  France ................................. 305/12

*Primary Examiner*—John A. Pekar
*Attorney, Agent, or Firm*—George A. Evans, Sr.

[57] ABSTRACT

A self-propelled refuse or trash compactor is provided at each cleated drum wheel with a fixed cylinder which extends around the axle housing of the compactor to the periphery of the drum wheel. A minimum operating clearance between the cylinder and the periphery of the drum wheel is allowed and is located such that there is no adjacent structure which may guide a discarded length of cable, for example, into said clearance. The fixed cylinder and drum wheel are also related so that the clearance is in the form of a labyrinth and the passage of the cable in any case and other debris in general through the clearance is prevented.

10 Claims, 4 Drawing Figures

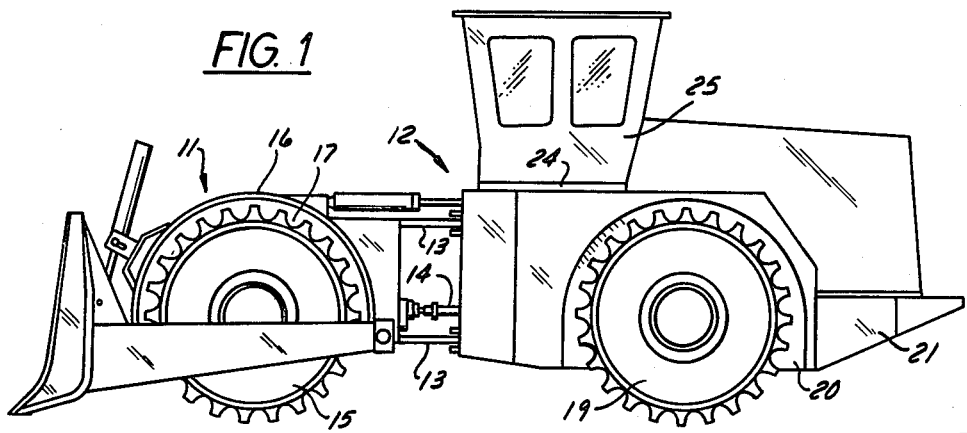
FIG. 1
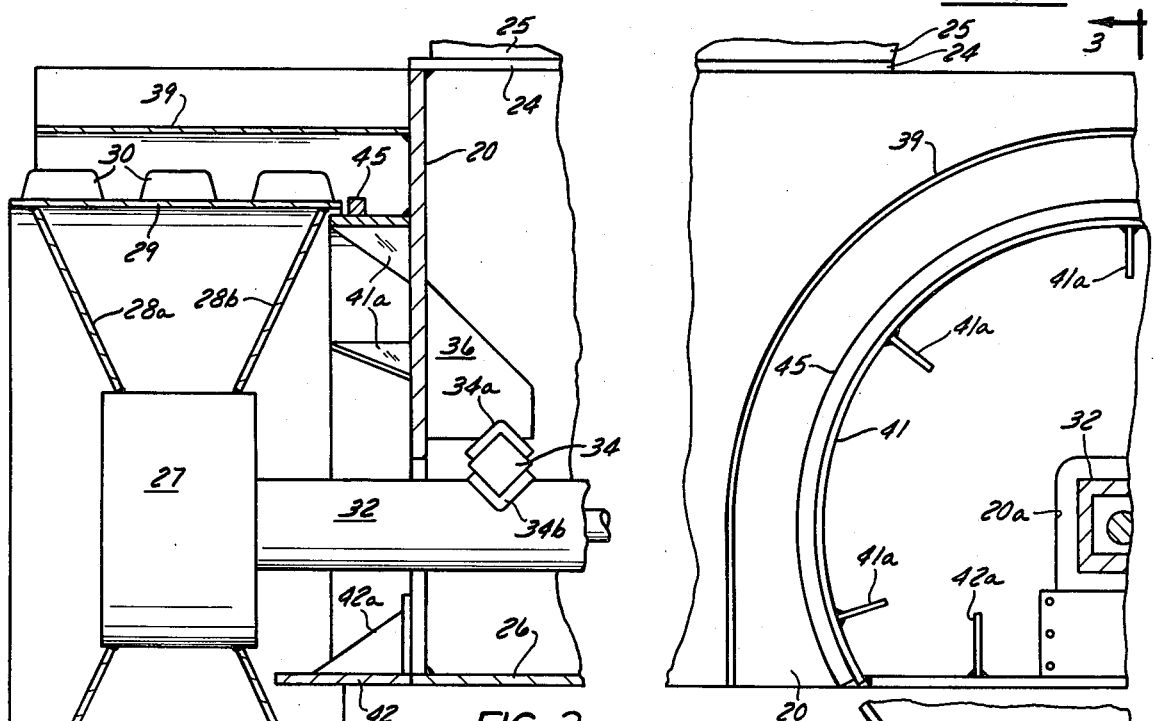
FIG. 2
FIG. 3
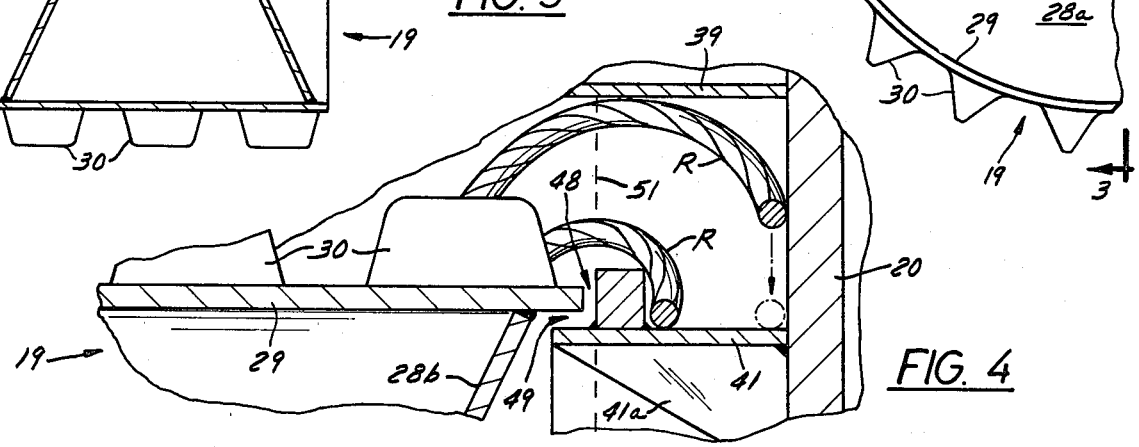
FIG. 4

NONFOULING WHEEL HOUSING FOR COMPACTION VEHICLE

BACKGROUND OF THE INVENTION

A sanitary landfill compaction vehicle typically operates over and must compact all forms and types of refuse which may be delivered to the site for such disposal. A preferred type of vehicle for that purpose is shown and described in U.S. Pat. Nos. 3,891,341 and 4,193,468 by the present inventor and others. The wheels of the vehicle comprise large totally closed drums with cleats and the vehicle chassis is also totally closed to prevent the intrusion of refuse. However, several items continue to present some difficulty. Bedsprings are one such item or type of refuse. If caught by a cleat, the bedspring is generally pulled up into and dragged around the wheel well. On occasion, however, the bedspring may become caught on some part of the housing and remain lodged in the wheel well. The springs are, of course, of a relatively hard spring steel and considerably harder than the weldable steel plate of which the wheels and housing are made. The springs quickly become a multiplicity of very effective lathe cutting tools which severely score or groove the wheel such that its replacement becomes a necessity.

Stranded steel cables of some length also may become wound around the axle housing and may halt the vehicle. However, mounting the wheel so that it is closely spaced from the inner wall of the well does not solve this problem, because the cable is then readily guided by the inner wall referred to and into the clearance which must be allowed between the wheel periphery and the wall. A clearance, such as referred to, is required because some degree of cushioning is required between the wheel or axle housing and the vehicle frame including its housing, even though such cushioning is of extraordinary stiffness.

The present invention substantially overcomes the described difficulties with cables and appears to have eliminated the bedspring problem, as well as similar problems with other forms of refuse.

SUMMARY OF THE INVENTION

The wheel housing for the drum wheel of a vehicle for compacting refuse defines a wheel well. A fixed cylinder extends from the inner housing wall to the drum wheel and is of a similar diameter except that the cylinder extends downwardly only to the elevation of the closed underside of the vehicle. The fixed cylinder also has a protective shoulder facing the inner wall. In particular, a cable (as refuse) which may be drawn up into the wheel well is unlikely to be aligned with the required operating clearance between the drum wheel and the fixed cylinder and is, thus, unlikely to be pulled into said clearance. Additionally, the closely adjacent ends of the cylinder and drum wheel form a partial, but effective labyrinth. In the unlikely event that some part of a rope or cable does enter the clearance, in no case can it be pulled through the clearance and then become wrapped around the axle housing. Other types of refuse such as bedsprings are, of course, also excluded by the labyrinth. A lower plate extends from the inner housing wall to the inner face of the drum wheel and is removable for the removal of the caked soil and the like from the interior surfaces of the protective assembly.

BRIEF DESCRIPTION OF THE DRAWINGS

FIG. 1 is a side elevation of a self-propelled refuse compacting machine.

FIG. 2 is an enlarged side elevation of one-half of the rear wheel well of the machine shown in FIG. 1 and with the rear wheel shown only in part.

FIG. 3 is vertical section taken on line 3—3 of FIG. 2 with the wheel in place. The axle housing and wheel hub are shown in elevation. The drum of the wheel is shown in section.

FIG. 4 is a further enlarged vertical section of the adjacent parts of the wheel drum and the fixed cylinder extending from the inner wall of the wheel well. The section of a cable and its guided movement is also shown.

DESCRIPTION OF THE PREFERRED EMBODIMENT

The vehicle or machine shown in FIG. 1 includes the forward section 11 and the main section 12. The upper and lower arms 13 of section 11 are joined to the main section 12 by pins for pivotal movement of the two sections and the articulation of the machine for steering. The drive line 14 from the engine (not shown) which is a part of section 12 extends forwardly therefrom and is connected to the forward drive shaft (not shown) which differentially drives the two forward wheels, of which wheel 15 is shown. The fender 16 extends around wheel 15 and projects from the vertical plate 17 which with fender 16 forms a wheel well for wheel 15. A similar wheel well is provided for the wheel at the other side of forward section 11 and also for each of the rear wheels. The rear wheel 19 and the housing for the wheel 19 which forms the well in which the wheel is mounted will be described in detail.

The main section 12 of the machine is supported by the rear drum wheels, including wheel 19. Two laterally spaced vertical plates, including the plate 20, comprise a structural part of the frame of section 12. Such plates are joined forwardly by cross-members to which the arms 13 are pinned and are joined rearwardly by the platform 21. The plate 24 extends across the tops of the two vertical plates, including plate 20, and supports the operator's cab 25. The lower plate 26 extending from the lower margin of plate 20 to the corresponding other plate forms the underside of the machine.

The drum wheel 19 as shown in section in FIG. 3 includes the hub 27, the two conical end discs 28a and 28b and the drum 29 which is provided with the cleats 30. As such, wheel 19 is entirely closed so that dirt and refuse cannot become lodged in the wheel. One end of axle housing 32 is supported by wheel 19 as shown and extends through the opening 20a in plate 20 to the drive differential, now shown, at the centerline of the machine. For illustrative purposes only, a resilient cushion 34 between the holders 34a and 34b is shown and is one of several providing for the support of the machine. For that purpose, bracket 36 extending from plate 20 with holder 34a rests on cushion 34 which rests on holder 34b secured to axle housing 32.

The upper part of curved plate 39 extending from plate 20 over and around wheel 19 is cylindrical and the two lower parts which extend downwardly to the level of plate 26 form a fender which with plate 20 forms a wheel well. In the particular embodiment of the invention shown, plates 20 and 39 are also part of a tank for engine fuel forwardly of wheel 19.

The partial cylinder 41 extends around axle housing 32 and its lower ends are joined by the horizontal, flat plate 42 which forms an extension of lower plate 26. The inner edge of cylinder 41, having reference here to the machine, abuts and is welded to plate 20 and is also held by the braces 41a. The outer margin of cylinder 41 is closely adjacent to the inner edge of the drum 29 of wheel 19 to form a minimum space therebetween.

In the preferred embodiment of the invention, the cylinder 41 extends a short distance within drum 29 and is essentially concentric therewith, except for the slight motion of drum 29 relative to cylinder 41 as is allowed by the resilient cushion 34. That is, and as already mentioned, the amount of springing is minimal, but some amount is considered necessary to protect the operating elements of the machine against extreme shock loads.

Advantageously, plate 42 provides a flat surface for cutting away any material which might have continuously wrapped around cylinder 41. Plate 42 may be variously attached to plates 20 and 26, but is preferably removably mounted, e.g. by bolts, to facilitate the removal of caked soil and the like from the interior surfaces of the protective assembly formed by cylinder 41 and plate 42. Having reference again to the machine, it should be noted that the outer margin of plate 42 extends outwardly into drum wheel 19 to allow only a selected uniform and minimum gap between disc 28b and plate 42. Plate 42 should also be braced as by brace 42a.

The guard strip 45 is welded to the outside of cylinder 41 and is preferably of a size in section so that it projects radially beyond the drum 29 of wheel 19 (strip 45 is typically a 1×1½ inch [38.1×50.8 mm] solid steel bar). The strip 45 is also critically located with respect both to wheel 19 and plate 20. Specifically, as best seen in FIG. 4, the face of strip 45 adjacent to the end of drum 29 is spaced therefrom, for example, a fraction of an inch and defines a radial passage 48 of that size. It also joins the axial passage 49 between drum 29 and cylinder 41. Passages 48 and 49 are labyrinthine in effect as to the refuse to be excluded.

The opposite inner face of strip 45 is substantially spaced from plate 20 which forms the inner wall of the housing or wheel well. A distance in the order of 3 to 6 inches (114.3-228.6 mm) may be typical. This substantial distance effectively assures that passage 48 is well spaced from plate 20 so that any cable which has been drawn up into the wheel well by wheel 19 is wrapped and drawn around cylinder 41 between strip 45 and plate 20 and without serious effect. Such a cable R is shown in FIG. 4 and illustrates the tendency for some portion of the cable to be pushed against plate 20. Also, when cable R is wrapped on cylinder 41, it may be pulled axially toward and over guard strip 45 as shown in broken lines. Because the cable is crossed over passage 48 as well as the guard strip, there is no likelihood that the cable will be pulled into passage 48. This will be further apparent by considering that if the inner wall of the wheel well were located as indicated by the broken line 51, the cable R would be directed squarely into passage 48 and wear its way between drum 29 and the wall and require stopping of the machine so that it can be removed. The location of passage 48 as specified, is thus the critical aspect of the invention.

Having described the invention in specific detail and exemplified the manner in which it may be carried into practice, it will now be readily apparent to those skilled in the art that innumerable variations, applications, modifications and extensions of the basic principles involved may be made without departing from its sphere or scope.

I claim:

1. In a vehicle for compacting sanitary landfill refuse and the like including paired, opposite cleated drum wheels spaced from the respective side walls of the vehicle housing, said walls extending downward to the projected underside of the vehicle, wheel closure means between each side wall and wheel comprising a partial cylinder extending from the wall to the periphery of the wheel drum which is above the projected underside of the vehicle, and a flat plate fixed to and extending from the vehicle underside to the inner wheel face and joined to the lower margins of said fixed partial cylinder, the minimum operating clearance which is required to be provided between said fixed cylinder and wheel drum being located a substantial distance from the side wall such that refuse is unlikely to be drawn into said clearance and, for example, wrapped around the axle housing.

2. In the vehicle of claim 1, said partial cylinder extending to the inside of the wheel drum at its periphery and including a fixed outwardly projecting labyrinth member which with the drum periphery defines the clearance referred to.

3. In the vehicle of claim 2, said member projecting radially of the cylinder and forming an annular shoulder which prevents stiff ropes, cables and the like from being wrapped around the cylinder and drawn into said clearance.

4. In the vehicle of claim 3, said member being dimensioned to project radially beyond the wheel drum.

5. In the vehicle of claim 1, said flat plate being removably fixed to the vehicle underside and fixed partial cylinder.

6. A vehicle for compacting sanitary landfill refuse and the like including cleated drum wheels set in wheel wells formed by housing members of the vehicle, said members including a vertical inner wall normal to and surrounding the vehicle axle housing and a semi-cylindrical wall extending from said inner wall and over each drum wheel, both walls extending downward to the projected underside of the vehicle, a partial cylinder extending from said inner wall to the periphery of the wheel drum which is above the projected underside of the vehicle, and a flat plate fixed to and extending from the vehicle underside to the inner wheel face and joined to the lower margins of said fixed partial cylinder, the minimum operating clearance which is required to be provided between said fixed cylinder and wheel drum being located a substantial distance from said inner wall such that refuse is unlikely to be drawn into said clearance and, for example, wrapped around the axle housing.

7. The vehicle of claim 6 wherein said partial cylinder extends to the inside of the wheel drum at its periphery and includes a fixed outwardly projecting labyrinth member which with the drum periphery defines the clearance referred to.

8. The vehicle of claim 7 wherein said member projects radially of the cylinder and forms an annular shoulder which prevents stiff ropes, cables and the like from being wrapped around the cylinder and drawn into said clearance.

9. The vehicle of claim 7 wherein said member projects radially beyond the wheel drum.

10. In the vehicle of claim 6, said flat plate being removably fixed to the vehicle underside and fixed partial cylinder.

* * * * *